United States Patent
P R et al.

(10) Patent No.: US 11,181,934 B1
(45) Date of Patent: Nov. 23, 2021

(54) SYSTEMS AND METHODS FOR PREDICTING GROUND EFFECTS ALONG A FLIGHT PLAN

(71) Applicant: HONEYWELL INTERNATIONAL INC., Morris Plains, NJ (US)

(72) Inventors: Sriram P R, Chennai (IN); Lisa Fern, Seattle, WA (US); Sivakumar Kanagarajan, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 16/920,070

(22) Filed: Jul. 2, 2020

(30) Foreign Application Priority Data

May 20, 2020 (IN) .............................. 202011021225

(51) Int. Cl.
*G05D 1/10* (2006.01)
*B64D 43/00* (2006.01)
*G08G 5/00* (2006.01)
*B64C 29/00* (2006.01)

(52) U.S. Cl.
CPC ......... *G05D 1/102* (2013.01); *B64C 29/0016* (2013.01); *B64D 43/00* (2013.01); *G05D 1/106* (2019.05); *G08G 5/0073* (2013.01)

(58) Field of Classification Search
CPC .... G05D 1/102; G05D 1/106; B64C 29/0016; B64D 43/00; G08G 5/0073
See application file for complete search history.

(56) References Cited

U.S. PATENT DOCUMENTS

| | | | |
|---|---|---|---|
| 3,190,582 A | 6/1965 | Lippisch | |
| 3,244,246 A | 4/1966 | Weiland | |
| 6,963,291 B2 | 11/2005 | Holforty et al. | |
| 7,926,340 B2 | 4/2011 | Calmels | |
| 8,489,373 B2 | 7/2013 | Calmels | |
| 9,317,040 B1 | 4/2016 | Hilde | |
| 9,802,713 B2 | 10/2017 | Sabnis et al. | |
| 9,828,087 B2 | 11/2017 | Pr et al. | |

(Continued)

OTHER PUBLICATIONS

Sanchez-Cuevas, Pedro, et al. "Characterization of the Aerodynamic Ground Effect and Its Influence in Multirotor Control," Aug. 17, 2017, International Journal of Aerospace Engineering vol. 2017, Article ID 1823056, 17 pages, https://doi.org/10.1155/2017/1823056.

*Primary Examiner* — Hussein Elchanti
(74) *Attorney, Agent, or Firm* — Lorenz & Kopf, LLP

(57) ABSTRACT

The present disclosure provides systems and methods for predicting ground effects along a flight plan. The systems and methods provide a processor executed process including the steps: receiving a flight plan for a vertical take-off and landing (VTOL) aircraft; receiving terrain and obstacles geospatial data for the flight plan from the database; determining weight of the VTOL aircraft along the flight plan; determining temperature of the environment along the flight plan; determining ground effect data along the flight plan based on the temperature and the weight; based on the terrain and obstacles data, the ground effect data and the flight plan, predict where, along the flight plan, the VTOL aircraft will traverse a ground effect region, thereby providing prediction data; and generating one or more commands to control a system of the VTOL aircraft based on the prediction data.

20 Claims, 4 Drawing Sheets

(56) References Cited

U.S. PATENT DOCUMENTS

| | | | |
|---|---|---|---|
| 10,012,982 B2* | 7/2018 | Kratz | H04N 5/23206 |
| 10,017,263 B2 | 7/2018 | Litwinowicz | |
| 10,053,208 B1 | 8/2018 | Beckman et al. | |
| 10,410,527 B2 | 9/2019 | Navot et al. | |
| 10,526,080 B1 | 1/2020 | Hooi | |
| 2005/0197811 A1 | 9/2005 | Ariyur | |
| 2005/0230563 A1* | 10/2005 | Corcoran, III | B64C 13/18 244/175 |
| 2011/0264314 A1* | 10/2011 | Parras | G05D 1/0676 701/16 |
| 2011/0299732 A1* | 12/2011 | Jonchery | G06K 9/2018 382/103 |
| 2013/0062455 A1* | 3/2013 | Lugg | B64C 39/12 244/12.3 |
| 2016/0140854 A1 | 5/2016 | Enns et al. | |
| 2016/0189549 A1* | 6/2016 | Marcus | G08G 5/0091 701/3 |
| 2016/0207625 A1* | 7/2016 | Judas | B64C 29/0025 |
| 2016/0376031 A1* | 12/2016 | Michalski | G05D 1/0669 701/15 |
| 2017/0106537 A1* | 4/2017 | Chizeck | B25J 9/1689 |
| 2017/0148467 A1* | 5/2017 | Franklin | G10L 25/39 |
| 2017/0178518 A1* | 6/2017 | Foladare | G08G 5/0034 |
| 2017/0243494 A1* | 8/2017 | Taveira | G08G 5/0069 |
| 2017/0267343 A1* | 9/2017 | Chen | G06Q 10/08355 |
| 2019/0031371 A1* | 1/2019 | Ross | B64C 29/0033 |
| 2019/0340934 A1 | 11/2019 | Villa et al. | |
| 2020/0023993 A1 | 1/2020 | Germanetti | |

* cited by examiner

SYSTEMS AND METHODS FOR PREDICTING GROUND EFFECTS ALONG A FLIGHT PLAN

CROSS REFERENCE TO RELATED APPLICATION

This application claims priority to Indian Provisional Patent Application No. 202011021225, filed May 20, 2020, the entire content of which is incorporated by reference herein.

TECHNICAL FIELD

The present disclosure generally relates to systems and methods for predicting ground effects along a flight plan of a vertical take-off and landing (VTOL) aircraft. More particularly, the systems and methods described herein provide for displaying symbology representing the predicted ground effects and/or automatically controlling the VTOL aircraft based on predicted ground effects.

BACKGROUND

VTOL aircraft (rotorcrafts or air taxi's) are frequently subjected to ground effects including in-ground effects (IGE) and out-of-ground effects (OGE). The in-ground effects induce an additional lift force on the aircraft, which, when not managed properly, can lead to undesirable effects for the aircraft. Additionally, in cases of urban VTOL aircraft operations, while in a sky port or helipad, in-ground effect during hover taxiing can result in an increased outflow distortion of the blade tip vortices. The outflow of air may disturb adjacent unsecured ground equipment and/or cause the control surfaces of adjacent parked aircraft to be forced against their stops with a potential for damage. The transition from in-ground effect to out-of-ground effect can also cause a noticeable force change for the VTOL aircraft. Yet further, flying outside of out-of-ground effect must be considered carefully because hovering is no longer possible at such altitudes.

Accordingly, an object of the present disclosure is to provide systems and methods to determine ground effects, particularly ground effect change points, that impact the VTOL aircraft and control at least one VTOL system based on predicted ground effects along a flight plan. It may additionally be interesting to provide systems and methods that display the predicted ground effects to a pilot. Furthermore, other desirable features and characteristics of the disclosure will become apparent from the subsequent detailed description and the appended claims, taken in conjunction with the accompanying drawings and this background of the disclosure.

BRIEF SUMMARY

Systems and methods are provided for predicting ground effects along a flight plan. The systems and methods provide a processor executed process including the steps: receiving a flight plan for a vertical take-off and landing (VTOL) aircraft; receiving terrain and obstacles geospatial data for the flight plan from the database; determining weight of the VTOL aircraft along the flight plan; determining temperature of the environment along the flight plan; determining ground effect data along the flight plan based on the temperature and the weight; based on the terrain and obstacles data, the ground effect data and the flight plan, predict where, along the flight plan, the VTOL aircraft will traverse a ground effect region, thereby providing prediction data; and generating one or more commands to control a system of the VTOL aircraft based on the prediction data.

This summary is provided to describe selected concepts in a simplified form that are further described in the Detailed Description. This summary is not intended to identify key or essential features of the claimed subject matter, nor is it intended to be used as an aid in determining the scope of the claimed subject matter.

BRIEF DESCRIPTION OF THE DRAWINGS

The present disclosure will hereinafter be described in conjunction with the following drawing figures, wherein like numerals denote like elements, and wherein.

DETAILED DESCRIPTION

Figure 1:
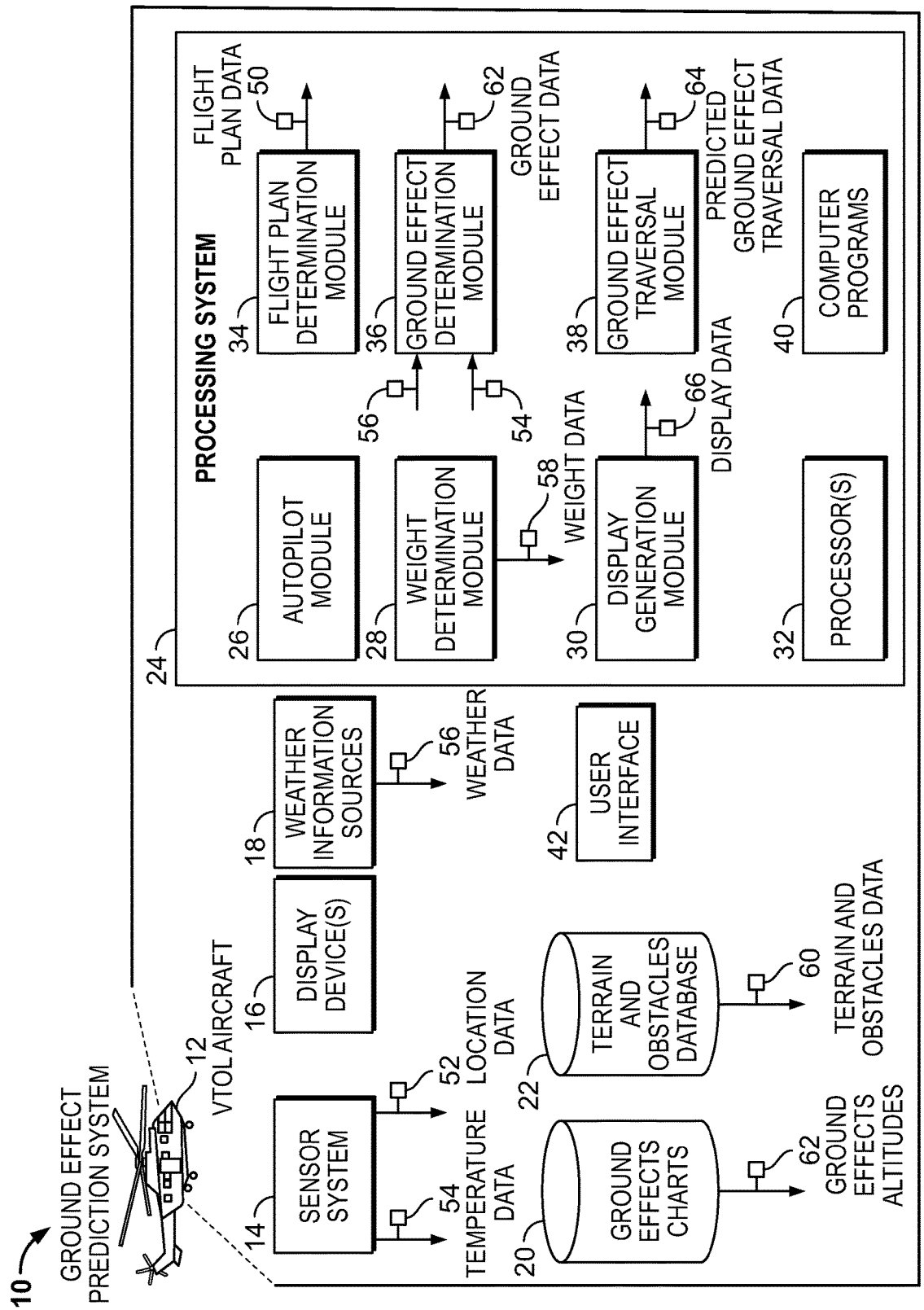
FIG. 1 is a schematic diagram of a system for predicting ground effects along a flight plan, in accordance with the present disclosure.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention, which is defined by the claims. Furthermore, there is no intention to be bound by any expressed or implied theory presented in the preceding technical field, background, brief summary, or the following detailed description.

The present disclosure provides systems and methods to predict ground effect change points for a VTOL aircraft along a flight plan. The ground effect type and altitude can be determined based on the weight of the VTOL aircraft and the environmental temperature. Ground effect change points can be determined based on transitions along the flight plan into and out of an in ground effect region and an out of ground effect region. A ground effect look up table can be used based on published performance charts for the VTOL aircraft. Alternatively, learning based algorithms can be used to derive the ground effect altitudes of the VTOL aircraft over a period. Based on the computed ground effect change points, a display can be generated for the pilot including ground effect symbology in the flight plan. Additionally, or alternatively, a displayed or audible alerting mechanism can be used for the ground effect change points. Additionally, or alternatively, the ground effect information can be prepared to adjust flight controls in a fly by wire (autopilot system). In autopilot embodiments, the systems and methods can determine the amount of force which is to be generated based on, for example, predicted approach speed of the aircraft, entry point into ground effect or exit point of the ground effect, and the type of ground surface. This information along with the start point of ground effect region and end point of ground effect region combined allows the system to generate appropriate commands to suppress or utilize the ground effect forces in accordance with the phase of flight of the aircraft. For systems without fly by wire technology, the ground effect indication on the display will help the pilot with the change in the forces acting on the aircraft at various instances.

Systems and methods described herein obtain the weight and temperature of the aircraft along the flight plan. With this information, ground effect altitudes of the aircraft are computed along the flight plan. In embodiments, the altitudes computed along the flight plan are compared with features in a terrain and obstacles database. The terrain and obstacles database may be available in the cockpit or hosted in a cloud environment. Once the compared data is obtained, the change points are mapped with the corresponding ground effects. The mapping may be displayed or output to an autopilot for generating responsive aircraft control commands. The pilot is, in embodiments, provided with an alerting mechanism before the aircraft enters a ground effect region. Suitable symbology is used to depict the corresponding ground effects. The symbology may graphically and/or textually/numerically depict whether the ground effect is in ground effect or out of ground effect and may graphically and/or textually/numerically depict the corresponding altitude for commencement of the ground effect along the flight plan.

Having summarized the systems and methods for predicting ground effects in the foregoing, a more detailed description is provided in the following with respect to FIGS. 1 to 4. FIG. 1 depicts an exemplary embodiment of a ground effect prediction system 10 including a VTOL aircraft 12, a sensor system 14, a database of ground effect charts 20, a terrain and obstacles database 22, a display device 16, weather information sources 18, a user interface 42 and a processing system 24. It should be understood that FIG. 1 is a simplified representation of ground effect prediction system 10, and FIG. 1 is not intended to limit the application or scope of the subject matter in any way. In practice, the system 10 and/or VTOL aircraft 12 will include numerous other devices and components for providing additional functions and features, as will be appreciated in the art.

The VTOL aircraft 12 is one that can hover, take off, and land vertically. VTOL aircrafts can include a variety of types of aircraft including fixed-wing aircraft as well as helicopters and other aircraft with powered rotors, such as cyclogyros/cyclocopters and tiltrotors. The VTOL aircraft 12 may be an electric or hybrid-electric vertical takeoff and landing aircraft eVTOL or may be otherwise powered. The VTOL aircraft 12 can be a human piloted (ground-based or cockpit-based) aircraft (usually with assistance of an autopilot module 26) or an unmanned aerial vehicle (drone). The VTOL aircraft 12 is, in embodiments, a passenger air vehicle (PAV) or does not carry passengers (e.g. a cargo aircraft). In embodiments, the VTOL aircraft 12 is a rotorcraft.

The processing system 24 includes one or more processors 32 that are configured to execute computer programming instructions stored on non-transitory memory (not shown) and embodied in computer programs 40. Functions of the ground effect prediction system 10 and steps of method 200 (FIG. 2) are carried out by one or more processors 32 of the processing system 24 executing the associated computer programming instructions of computer programs 40. Modules and processing system 24 as described herein refer to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. The modules 26, 28, 30, 34, 36, 38 of the processing system 24 are defined in the computer programs 40 and are executable by the processors 32 to carry out the described functions and steps. The modules 26, 28, 30, 34, 36, 3838 are illustrated separately from the computer programs 40 purely for the purposes of illustration when they would, in reality, be embodied in the computer programs 40.

The processing system 24 includes a flight plan determination module 34 for determining a flight plan based on inputs representing at least a destination location. The flight plan determination module 34 outputs flight plan data 50. The destination location can be entered through the user interface 42, which may be ground-based or cockpit-based. The user interface 42 may be a keyboard device (virtual or physical), a voice recognition unit, a touchscreen device, a mouse device, a trackball device, or any other suitable user input device. The flight plan data 50 describes a flight path from a source location to the destination location. The source location of the flight plan is often a current location obtained from location data 52 from the sensor system 14 (and described further below). The flight plan data 50 may include a series of geospatial waypoints defined in three-dimensional space including longitude, latitude and altitude. The flight plan determination module 34 can utilize any known flight plan routing algorithm and determines the flight path based additionally on a navigation database (not shown) included in the ground effect prediction system 10. The flight plan determination module 34 may be included as part of a flight management system (not shown) of the VTOL aircraft 12.

In one embodiment, the sensor system 14 includes a Global Positioning System (GPS) or global navigation satellite system (GNSS) receiver and is configured to determine location of VTOL aircraft 12 based on global position data obtained from satellites, e.g. by trilateration with three or more satellites. In some embodiments, the sensor system 14 is configured to determine VTOL aircraft location based on Wide Area Augmentation System (WAAS) or other augmented satellite-based global position data. A network of ground-based reference stations provides measurements of small variations in the GPS satellites' signals so that onboard GPS or GNSS receivers use the corrections while computing their positions to improve accuracy of location data 52. The sensor system 14 includes sensors distributed throughout VTOL aircraft 12 to provide aircraft data (not shown), as will be described further herein. Further, the sensor system 14 includes a thermocouple or other temperature measure device in order to provide temperature data 54 for the current environment.

The database of ground effect charts 20 include digital versions of published hover charts for the VTOL aircraft 12. A significant aspect of VTOL aircraft 12 performance revolves around whether or not the VTOL aircraft 12 can be hovered. More power is required during the hover than in any other flight regime. The systems and methods described herein allow enhanced management of hovering information and the impact of differing hovering conditions on the VTOL aircraft 12. Hover charts are provided for in ground effect (IGE) hover and out of ground effect (OGE) hover under various conditions of gross weight, altitude, temperature, and power. The IGE hover ceiling is usually higher than the OGE hover ceiling because of the added lift benefit produced by ground effect. At some point, the power required is equal to the power available. This establishes the hovering ceiling under the existing conditions. Any adjustment to the gross weight by varying fuel, payload, or both, affects the hovering ceiling. The heavier the gross weight, the lower the hovering ceiling. As gross weight is decreased, the hover ceiling increases. Accordingly, the database of ground effect charts 20 can be interrogated to obtain in ground effect and out of ground effect altitudes 62, which will be used by the systems and methods described herein to determine ground effect change points along the flight plan.

In order to interrogate the database of ground effects charts 20 and obtain ground effects altitudes, the ground effect prediction system 10 determines the weight of the VTOL aircraft 12 and the temperature of the environment at locations distributed throughout the flight plan.

The processing system 24 includes a weight determination module 28 that determines the weight of the VTOL aircraft 12 at distributed points (e.g. each waypoint) throughout the flight plan and outputs corresponding weight data 58. The weight determination module 28 receives an initial aircraft weight (at the source location) based on, for example, cargo loaded, number of passengers, initial amount of fuel and known empty weight of the VTOL aircraft 12. This information may be entered via the user interface 42. The weight determination module 28 calculates fuel usage based on the flight plan including distance travelled, planned speed of travel, any wind conditions that may affect rate of fuel usage (and which is known from weather data 56 obtained from the weather information sources 18 (described further below)) and any other relevant fuel consumption parameters. Fuel consumption determination algorithms are known in the art. Based on the amount of fuel consumed at locations distributed throughout the flight plan, a reducing weight of the VTOL aircraft 12 can be determined. Any other factors reducing the weight of the VTOL aircraft 12 along the flight plan may also be taken into account in determining the varying weight of the VTOL aircraft 12 (e.g. dropping off cargo or passengers at locations along the flight plan).

The ground effect determination module 36 retrieves temperature information for locations and times distributed throughout the flight plan. The temperature information can be obtained from sensor system 14 for local temperature data 54 (e.g. from a temperature sensor) and from uplinked weather data for more distant temperature data, which is obtained from the weather information sources 18. The weather information sources 18 provide location specific weather data 56 including geospatial temperature data. The weather information sources 18 include surface aviation weather observations from ground stations (e.g. METARs), air traffic control weather information, upper air weather observations (e.g. aircraft meteorological data relay (AMDAR) and ground-based, satellite or aircraft mounted radar observations (e.g NEXRAD). Satellite datalink services allow sharing of weather information to provide detailed and comprehensive real-time weather data 56 including accurate temperature data at each location (e.g. waypoint) along the flight plan. The temperature data includes forecast temperature data based on the predicted time of the VTOL aircraft 12 at each location along the flight plan, where the predicted time is encapsulated in the flight plan.

The ground effect determination module 36 uses the flight plan, temperature data 54, 56 and the weight data 58 to determine in ground effect altitudes and out of ground effect altitudes for locations distributed throughout the flight plan and possibly based on other aircraft specific parameters. The in ground effect altitudes may be a maximum distance from the ground (or other ground surface) at which an in ground effect will be experienced by the VTOL aircraft at each location according to the specified altitude from the flight plan, the weight at that location and the temperature at that location. The out of ground effect altitudes include at least a height relative to ground (or other ground surface) for which in ground effect is no longer experienced and may also include a maximum ceiling for the out of ground effect (above which hovering is not possible), again based on the specific combination of weight, altitude and temperature for each location along the flight plan. The ground effect determination module 36 uses the database of ground effect charts 20 in some embodiments to determine the ground effect altitudes 62. However, in other embodiments, the ground effect determination module 36 includes learning algorithms to learn the dependence of in and out of ground effect altitudes 62 on altitude, weight and temperature and any other factors that are considered to be of relevance. Instead of a look-up table in a database, a formula calculation may be used. The ground effect determination module 36 may additionally consider other factors such as terrain in determining the ground effect altitudes 62, which is known from terrain and obstacles data 60 from terrain and obstacles database 22. Different types of terrain will have different impacts on in ground effect altitudes. Generally, smoother terrain (such as calm waters, desert terrain, etc.) will allow for higher in ground effect altitudes than rougher terrain (such as forestry, rocky areas, etc.). The ground effect determination module 36 receives, or calculates, the ground effect altitudes and corresponds them with geospatial information from the flight plan, to thereby provide ground effect data 62.

The processing system 24 includes the ground effect traversal module 38, which determines points along the flight path where the VTOL aircraft will traverse a ground effect region. The ground effect traversal module 38 outputs predicted ground effect traversal data 64. In some embodiments, the ground effect traversal module 38 determines ground effect change points, specifically when entering an in ground effect region from an out of ground effect region and when entering an out of ground effect region from an in ground effect region. These change points are embodied in the predicted ground effect traversal data 64. In embodiments, the ground effect traversal module 38 receives, as inputs, the ground effect data 62, the terrain and obstacles data 60 and the flight plan data 50. The terrain and obstacles data 60 is evaluated with respect to the ground effect altitudes embodied in the ground effect data 62 to determine relative heights above ground surfaces (including terrain and obstacle surfaces) of the boundary between in and out of ground effect altitudes (and optionally also the out of ground effect ceiling). The flight plan can then be evaluated with respect to those boundaries to determine when the VTOL aircraft 12 is predicted to cross into and out of in ground effect and out of ground effect regions and thus to predict ground effect change points along the whole flight plan, thereby providing predicted ground effect traversal data 64.

The predicted ground effect traversal data 64 can be used in one or more different ways. In one embodiment, the processing system includes a display generation module 30 for generating a display on the one or more display devices 16 to depict symbology representing ground effect change points (or other ground effect data). The display generation module 30 outputs display data 66 embodying the presentation for the one or more display devices 16. In some embodiments, the generated display is a synthetic vision display showing value of aircraft parameters (such as speed, altitude, etc.) based on data from the sensor system 14, terrain and obstacles based on terrain and obstacles data 60 and also the ground effect symbology described herein. The display device(s) 16 outputs presentations 300, 400 (see FIGS. 3 and 4) based on the display data 86. In embodiments, the display device 16 is located remotely from the VTOL aircraft 12 or in a cockpit of the VTOL aircraft 12 or a combination of both. The display device 16 is a primary flight display, a head-up display, a head mounted display or some other type of display in various embodiments.

Figure 3:
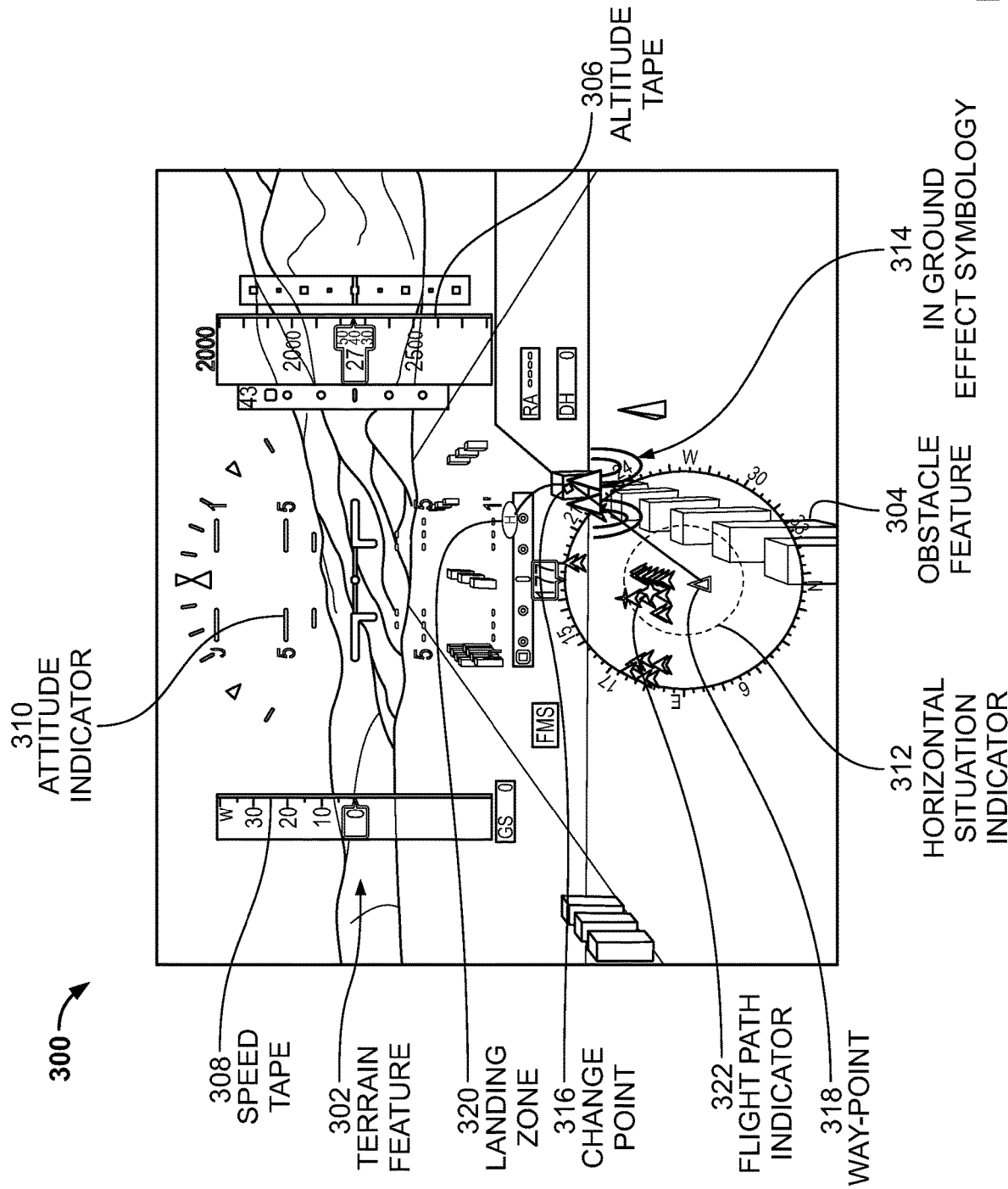
FIG. 3 is an exemplary display including ground effect symbology, in accordance with an embodiment of the present disclosure.

Referring to FIG. 3, an exemplary presentation 300 is a synthetic vision display including terrain and obstacle features 302, 304. Further, the presentation includes one or more indicators of flight parameters, including a speed tape 308, an altitude or vertical speed tape 306, an attitude indicator 310, and a horizontal situation indicator 312. Values for each indicated parameter are derived from the sensor system 14. The presentation 300 includes a flight path indication 322, which includes lines connecting waypoints 318 and is generated based on the flight plan data 50. Further, the presentation 300 includes in ground effect symbology 314 showing where the flight path will enter an in ground effect region. That is, a location along the flight path of transitioning from out of ground effect to in ground effect is shown by a positioning of the symbology 314 along the flight plan. That is, the display generation module 30 will transform the three dimensional real world position of the change point to a position in the two dimensional image space. The in ground effect symbology 314 may include force arrows, as shown, indicating a direction of force experienced by the VTOL aircraft 12. Further, the in ground effect symbology 314 may be accompanied by an indication of the altitude (absolute) below which in ground effects will be experienced (e.g. the altitude at which the ground effect will transition from out of ground effect to in ground effect). The in ground effect symbology 314 may further include a pseudo waypoint indicating a location along the flight path indication 322 depicting the start point of the effect. Because of the change of forces on the VTOL aircraft 12 at ground effect transitions, ground effect symbology can increase safety in operating VTOL aircraft 12. Although graphical symbology is displayed in the present embodiment, other outputs could be used such as an audible output (e.g. speech annunciation) when there is an imminent ground effect change point.

Figure 4:
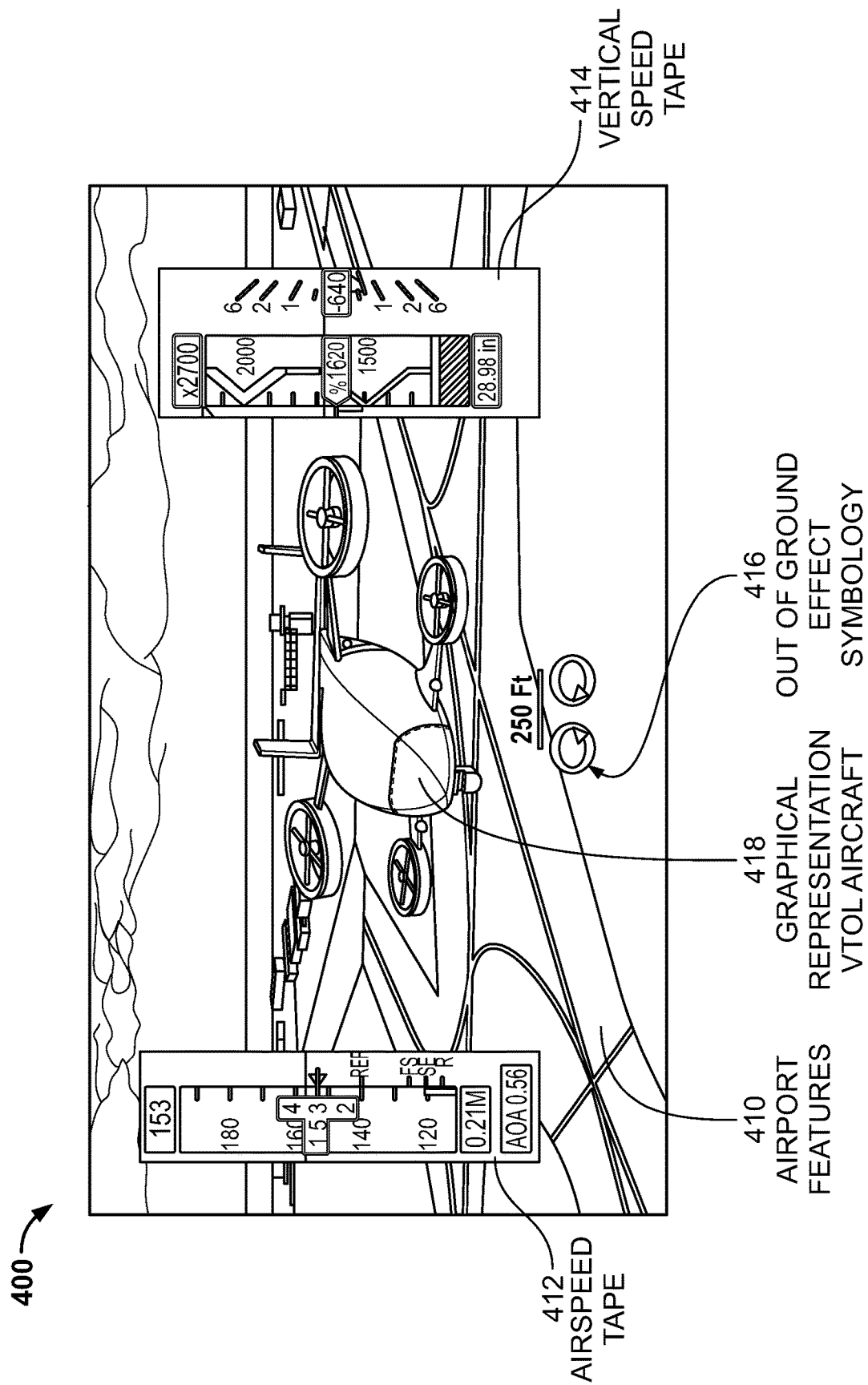
FIG. 4 is an exemplary display including ground effect symbology, in accordance with another embodiment the present disclosure.

Referring to FIG. 4, another exemplary presentation 400 is shown, in the form of a synthetic vision display. The presentation 400 includes airport terrain and obstacles features 410 such as runways, taxiways, landing pads, etc. available from the terrain and obstacles database 22. The presentation 400 includes at least one indicator of aircraft parameters such as an airspeed tape 412 and a vertical speed tape 414, values of which are available from the sensor system 14. The presentation 400 further includes a graphical representation of the VTOL aircraft 418. The presentation 400 includes an out of ground effect symbology 416 providing a symbol different from the in ground effect symbology 314. In this case, the out of ground effect symbology 416 is in the form of a circulating ring vortex whereas the in ground effect symbology 314 is in the form of a U-shaped air flow. Further, a pseudo waypoint may be included with the out of ground effect symbology, similar to that shown in FIG. 3. Also, a numerical indication of altitude at which the out of ground effect will begin to be experienced (e.g. the altitude at which the ground effect will transition from in ground effect to out of ground effect) is included. FIG. 4 shows the VTOL aircraft 12 preparing for take-off. In other flight conditions, the out of ground effect symbology 416 will be shown located along the flight plan to illustrate a location when the VTOL aircraft 12 will transition from in ground effect to out of ground effect including the altitude for that transition, in a manner analogous to that shown in FIG. 3.

Although presentations 300, 400 of FIGS. 3 and 4 are 3D perspective, synthetic vision displays, other display formats are suitable for graphically representing a flight plan and symbology representing location of ground effect change points.

In some embodiments, autopilot module 26 is configured to receive predicted ground effect traversal data 64 and to determine one or more commands representing maneuvers for safely traversing ground effect regions, particularly for improved handling at ground effect transitions. Autopilot module 26 is configured to determine an amount of force generation required based on predicted (or planned) speed of the VTOL aircraft 12 at the location of the ground effect region, the type of ground effect and optionally a type of ground surface at the location (e.g. based on terrain data from terrain and obstacles database 22). The determined force, which can be calculated from aeronautic principles or learned by the autopilot module 26 using machine learning, can be used as an input to determine the one or more commands. Change in ground forces predicted by the autopilot module 26 allows the autopilot module 26 to determine changes in thrust and/or steering and/or other controllable parameters of the VTOL aircraft 12, to effectively traverse ground effect regions. The one or more commands may be displayed on display device 16 as advisories for the pilot or they may be used as digital commands in a fly by wire system.

Whilst ground effect prediction system 10 is described herein as being located in VTOL aircraft 12, it should be understood that remote or cloud processing capabilities and data sources could be used by VTOL aircraft 12. As such, one or more components described with respect to VTOL aircraft 12, particularly processing system 24 and the associated modules 26, 28, 30, 34, 36, 38, may not necessarily be located onboard the VTOL aircraft 12.

Figure 2:
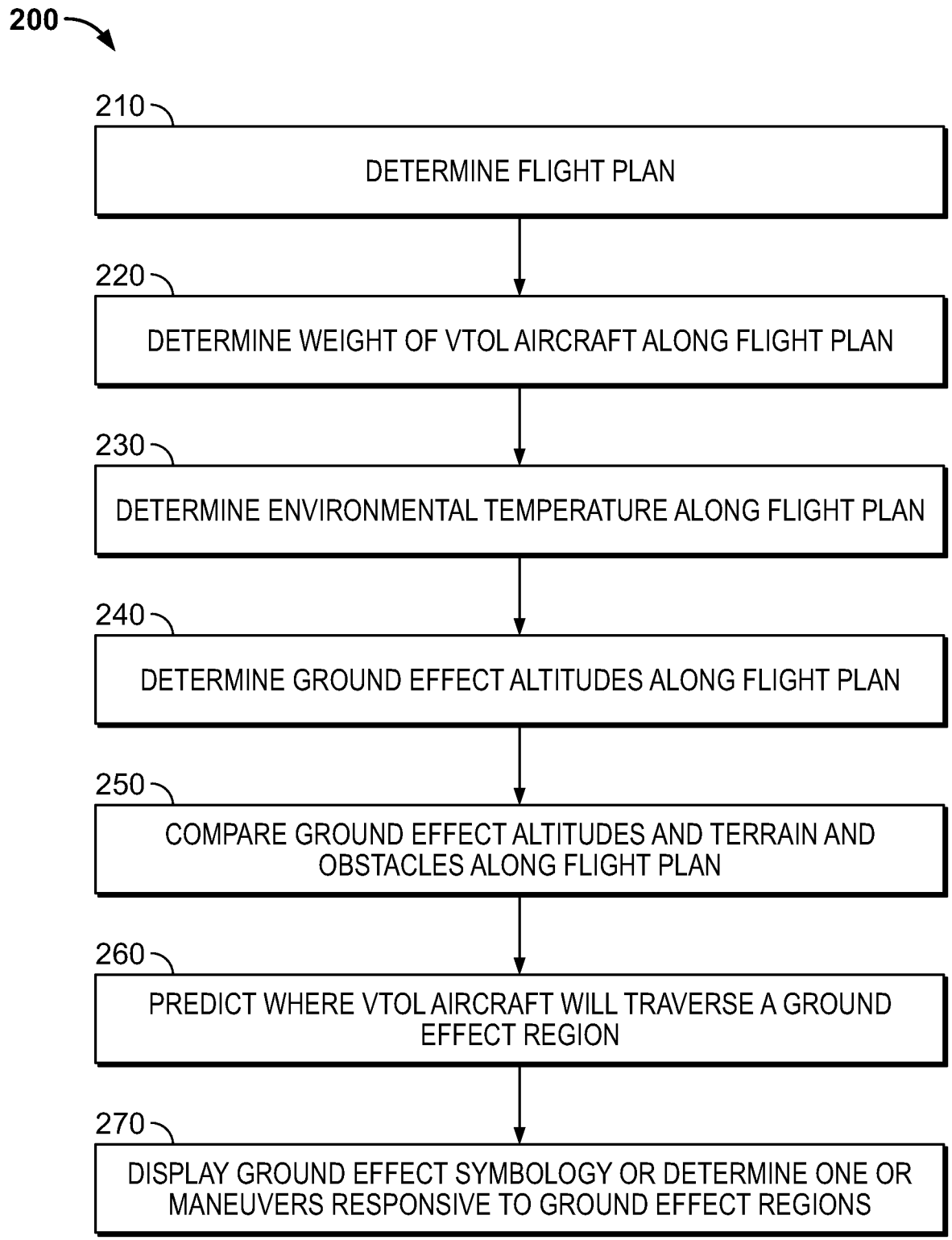
FIG. 2 is a flowchart of a method for predicting ground effects along a flight plan, in accordance with the present disclosure.

FIG. 2 is a flowchart illustrating an exemplary method 200 for predicting ground effects along a flight plan and controlling one or more VTOL vehicle systems based thereon, in accordance with various embodiments. Steps of method 200 are performed by the processing system 24 (FIG. 2) executing computer programming instructions of computer programs 40. Method 200 operates continuously during operation of VTOL aircraft 12 in some embodiments and operates in response to certain triggers (e.g. calculation of a flight plan) in other embodiments.

Method 200 includes step 210 of determining, via the flight plan determination module 34, a flight plan for the VTOL aircraft 12. The flight plan may be determined based on a routing algorithm using a current location of the VTOL aircraft 12 as one input and a destination location as another input. The current location is determined based on location data 52 from the sensor system 14. The destination location is entered by the user interface 42 or from a remote source. The flight plan includes a series of waypoints representing three-dimensional locations along which the VTOL aircraft 12 will track during flight. The flight plan may also include speed and other planned aircraft metrics.

Method 200 includes step 220 of determining, via the weight determination module 28, the weight of the VTOL aircraft 12 along the flight plan. Step 220 includes calculating a progressive reduction in the fuel weight of the VTOL aircraft 12 based on the flight plan as an input. Method 200 includes step 230 of determining environmental temperature along the flight plan. Local temperature can be determined from temperature data 54 from the sensor system 14. Distant temperatures can be predicted based on location along the flight plan, predicted time of passing that location from the flight plan and uplinked forecast weather for that time and location.

Method 200 includes step 240 of determining, via the ground effect determination module 36, ground effect altitudes along the flight plan. The ground effect altitudes may be heights relative to ground surfaces in some embodiments or absolute values or a combination of both. The ground effect altitudes will be impacted by pressure altitude (which is obtained from planned altitude along the flight plan), temperature and weight and possibly other factors. One exemplary further factor is ground surface type, which may be obtained from terrain and obstacles data 60. The ground effect altitudes may include a relative height of in ground effect, a relative height for commencement of out of ground effect conditions and an absolute ceiling for out of ground effect conditions. The ground effect altitudes can be determined from the database of ground effect charts 20, from a mapping of learned ground effect altitudes, or from a mathematical formula.

Method 200 includes step 250 of comparing, via ground effect traversal module 38, ground effect altitudes and terrain and obstacles along the flight plan based on the terrain and obstacles data 60. In particular, the location of a boundary between in and out of ground effect conditions above terrain and obstacles is determined and optionally also the upper boundary for out of ground effect flight. The flight plan is compared with the boundaries and ground effect change points along the flight plan may determined and output as predicted ground effect traversal data 64, thereby predicting where VTOL aircraft will traverse a ground effect region in step 260.

Although method 200 describes one exemplary manner of determining ground effect regions with respect to method steps 240 and 250, other process are envisaged. Based on predicted weight, temperature, flight plan altitude and terrain, various algorithms are possible for determining where the VTOL aircraft 12 will traverse an in ground effect region and an out of ground region and the transitions therebetween.

Method 200 includes step 270 of displaying ground effect symbology in one embodiment. In additional or alternative embodiments, method 200 includes determining one or more maneuvers in response to ground effect regions. Referring to FIGS. 3 and 4, method 200 includes displaying in ground effect symbology 314 and/or out of ground effect symbology 416 at ground effect change points along a display of a flight plan. The ground effect symbology 314, 416 depicts type of ground effect, location of ground effect by corresponding position in the two dimensional image and numerical identification of the altitude at which the ground effect will be first encountered when flying along the flight plan. Additionally or alternatively, the autopilot module 26 determines one or more commands for maneuvers that take into account calculated force conditions when traversing, and transitioning into, a particular kind of ground effect so as to ensure smooth and safe passage. The commands may be displayed on display device 16 for pilot information or may be sent as electronic instructions to one or more control surfaces or propulsion motors of the VTOL aircraft 12 to execute a fly by wire system.

Embodiments of the ground effect prediction system 10 have been described in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The use cases and the depictions provided here are only exemplary in nature. It should be possible to use different symbology and semantics to accomplish the same concepts described herein.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. Various changes may be made in the function and arrangement of elements described in an exemplary embodiment without departing from the scope of the invention as set forth in the appended claims.

The invention claimed is:

1. A system to predict ground effects along a flight plan, the system comprising:
   a database including terrain and obstacles geospatial data;
   at least one processor configured to execute program instructions, wherein the program instructions are configured to cause the at least one processor to:
   receive a flight plan for a vertical take-off and landing (VTOL) aircraft;
   receive terrain and obstacles geospatial data for the flight plan from the database;
   determine weight of the VTOL aircraft along the flight plan;
   determine temperature of the environment along the flight plan;
   determine ground effect data along the flight plan based on the temperature and the weight;
   based on the terrain and obstacles data, the ground effect data and the flight plan, predict where, along the flight plan, the VTOL aircraft will traverse a ground effect region, thereby providing prediction data;
   generate one or more commands to control a system of the VTOL aircraft based on the prediction data.

2. The system of claim 1, wherein the at least one processor is configured to execute program instructions to cause the at least one processor to:
   generate the one or more commands to control a display system of the VTOL aircraft to display symbology describing the ground effect region.

3. The system of claim 2, wherein the ground effect data includes type of ground effect and the symbology includes different symbology to represent an in ground effect and an out of ground effect.

4. The system of claim 2, wherein the ground effect data includes ground effect altitude and the symbology is associated with a representation of the ground effect altitude.

5. The system of claim 2, wherein the display system includes a primary flight display configured to display the symbology.

6. The system of claim 1, wherein the at least one processor is configured to execute program instructions to cause the at least one processor to:
   determine one or more maneuvers based on at least one of the ground effect data and the prediction data.

7. The system of claim 6, wherein the at least one processor is configured to execute program instructions to cause the at least one processor to:
   generate the one or more commands to control a display system of the VTOL aircraft to display guidance representing the one or more maneuvers.

8. The system of claim 6, wherein the at least one processor is configured to execute program instructions to cause the at least one processor to:
   generate the one or more commands to control an autopilot system of the VTOL aircraft to implement the one or more maneuvers.

9. The system of claim 1, wherein the program instructions are configured to cause the at least one processor to transmit the prediction data to one or more other VTOL vehicles or to a remote server.

10. The system of claim 1, wherein the program instructions are configured to cause the at least one processor to predict where, along the flight plan, the VTOL aircraft will enter and/or exit a ground effect region based on the terrain and obstacles data, the ground effect data and the flight plan and to include ground effect region entry and/or exit data into the prediction data.

11. The system of claim 1, wherein the program instructions are configured to cause the at least one processor to:
   determine an in-ground effect altitude and/or an out of ground effect altitude along the flight plan as part of the ground effect data based on the temperature and the weight;
   determine an altitude profile of the VTOL aircraft based on the terrain and obstacles data and the flight plan; and
   compare the in-ground effect altitude and/or the out of ground effect altitude to the altitude profile to predict where, along the flight plan, the VTOL aircraft will enter and/or exit a ground effect region and to include ground effect region entry and/or exit data into the prediction data.

12. A method to predict ground effects along a flight plan, the method comprising:
   receiving, via at least one processor, a flight plan for a vertical take-off and landing (VTOL) aircraft;
   receiving, via the at least one processor, terrain and obstacles geospatial data for the flight plan from a database;
   determining, via the at least one processor, weight of the VTOL aircraft along the flight plan;
   determining, via the at least one processor, temperature of the environment along the flight plan;
   determine, via the at least one processor, ground effect data along the flight plan based on the temperature and the weight;
   based on the terrain and obstacles data, the ground effect data and the flight plan, predict, via the at least one processor, where, along the flight plan, the VTOL aircraft will traverse a ground effect region, thereby providing prediction data;
   generate, via the at least one processor, one or more commands to control a system of the VTOL aircraft based on the prediction data.

13. The method of claim 12, comprising generating, via the at least one processor, the one or more commands to control a display system of the VTOL aircraft to display symbology describing the ground effect region.

14. The method of claim 13, wherein the ground effect data includes type of ground effect and the symbology includes different symbology to represent an in ground effect and an out of ground effect.

15. The method of claim 13, wherein the ground effect data includes ground effect altitude and the symbology is associated with a representation of the ground effect altitude.

16. The method of claim 13, wherein the display system includes a primary flight display configured to display the symbology.

17. The method of claim 12, comprising determining, via the at least one processor, one or more maneuvers based on at least one of the ground effect data and the prediction data.

18. The method of claim 17, comprising generating, via the at least one processor, the one or more commands to control a display system of the VTOL aircraft to display guidance representing the one or more maneuvers.

19. The method of claim 17, comprising generating, via the at least one processor, the one or more commands to control an autopilot system of the VTOL aircraft to implement the one or more maneuvers.

20. The method of claim 12, comprising transmitting, via the at least one processor, the prediction data to one or more other VTOL vehicles or to a remote server.

* * * * *